C. A. KULENKAMPFF.
LATHE ATTACHMENT.
APPLICATION FILED JULY 22, 1916.

1,211,183.

Patented Jan. 2, 1917.
2 SHEETS—SHEET 1.

WITNESSES

INVENTOR
Carl A. Kulenkampff
BY
ATTORNEYS

C. A. KULENKAMPFF.
LATHE ATTACHMENT.
APPLICATION FILED JULY 22, 1916.

1,211,183.

Patented Jan. 2, 1917.
2 SHEETS—SHEET 2.

WITNESSES
Oliver W. Holmes
A. L. Kitchin.

INVENTOR
Carl A. Kulenkampff
BY
ATTORNEYS

UNITED STATES PATENT OFFICE.

CARL A. KULENKAMPFF, OF BROOKLYN, NEW YORK.

LATHE ATTACHMENT.

1,211,183.  Specification of Letters Patent.  Patented Jan. 2, 1917.

Application filed July 22, 1916. Serial No. 110,720.

*To all whom it may concern:*

Be it known that I, CARL A. KULENKAMPFF, a citizen of the United States, and a resident of the city of New York, borough of Brooklyn, in the county of Kings and State of New York, have invented a new and Improved Lathe Attachment, of which the following is a full, clear, and exact description.

This invention relates to lathe attachments and has for an object the provision of an improved construction which may be quickly applied and removed, the construction being such that when in use it acts as a milling or finishing machine.

Another object in view is to provide a lathe and attachment which may be bolted to the carriage thereof by the same bolts used in holding the tool rest in place.

A still further object in view is to provide an attachment for lathes which may allow the use of a milling tool, the structure being such that the article being operated upon may be directed back and forth and may be gradually elevated at any time regardless of the shape of the article.

Figure 1:
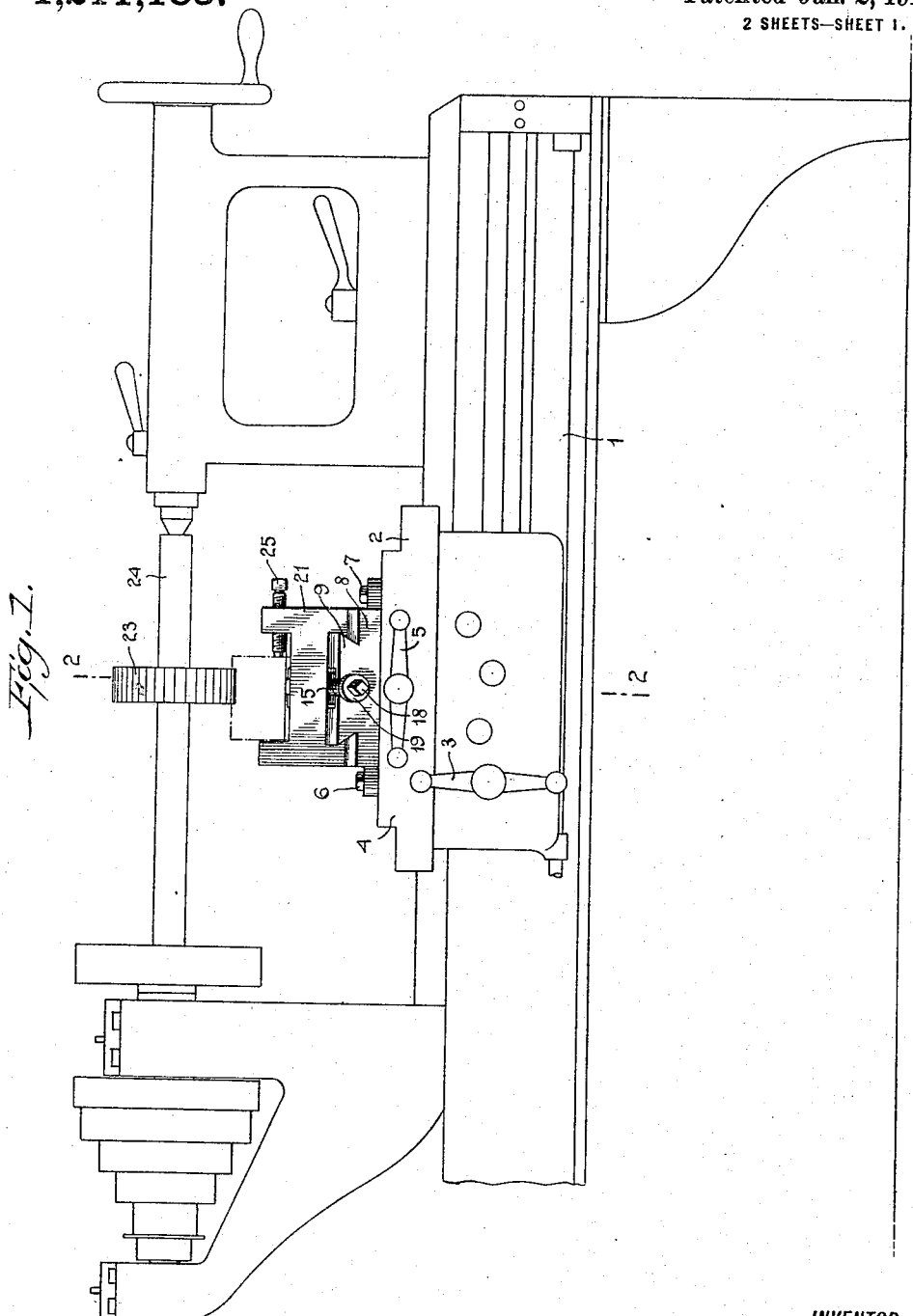
Figure 2:
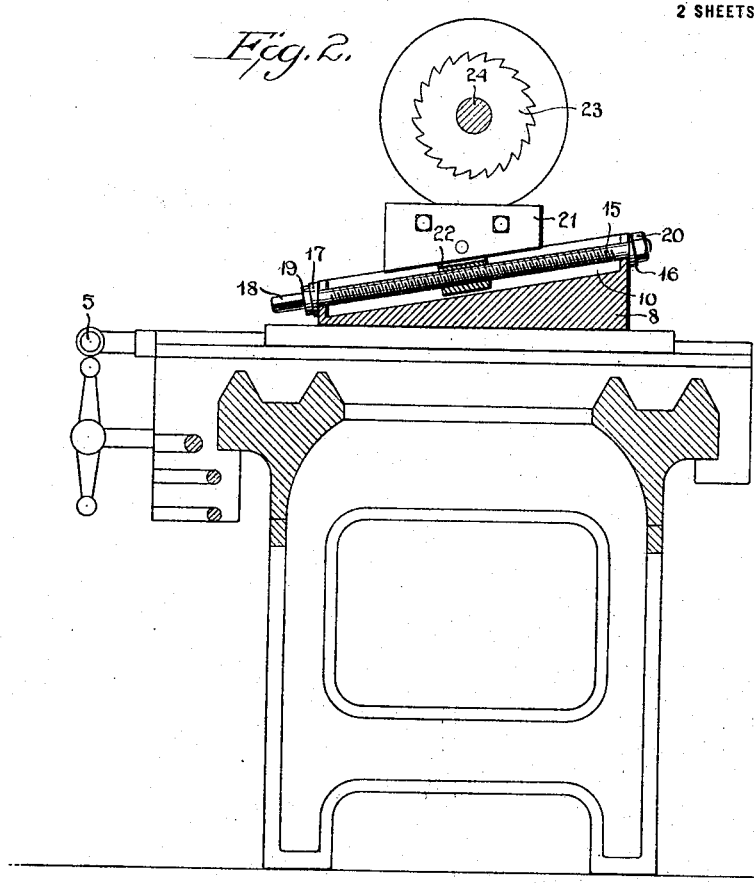
Figure 3:
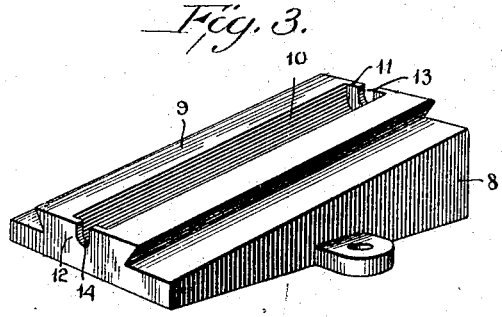

In the accompanying drawings: Figure 1 is a side view of part of the lathe with an attachment embodying the invention applied thereto. Fig. 2 is a section through Fig. 1 approximately on line 2—2. Fig. 3 is a detail perspective view of the wedge and guiding plate embodying certain features of the invention.

Referring to the accompanying drawings by numerals, 1 indicates the ordinary bed of a lathe, which lathe is provided with a carriage 2 propelled longitudinally of the bed 1 by suitable mechanism operated by the handle 3. The carriage 2 is also provided with a transversely moving member 4 driven by suitable mechanism set in motion by the handle 5. On the member 4 is usually secured by bolts 6 and 7 a tool rest but when the device embodying the invention is to be used the tool rest is removed and a wedge-shaped block 8 substituted. It will be noted that all of the structure from member 1 to screw or bolt 7 is old and well known and therefore forms no part of the present invention except in combination with the parts hereinafter described.

The wedge-shaped block 8 is provided with a dove-tail projection 9 having a hollowed-out portion 10. End walls 11 and 12 are provided at the end of the hollowed-out portion 10, said end walls having notches 13 and 14 through which the screw 15 extends, said screw having washers 16 and 17 at the respective ends. The screw 15 at one end is formed with a squared wrench receiving portion 18 and a sleeve 19, while at the opposite end a nut 20 is provided whereby the screw may be rotated freely without moving longitudinally.

A reciprocating transversely movable carriage 21 is mounted on the block 8 and is provided with a dove-tail groove and other members for fitting the upper surface of the wedge 8, as more clearly shown in Fig. 1. The lower surface of the carriage 21 is arranged at an angle complementary to the angle of the upper face of the wedge 8, while the upper surface of the carriage 21 is horizontal and remains horizontal as the carriage moves back and forth over the wedge 8. The carriage 21 is provided with a depending threaded sleeve 22 engaging the threads of the screw 15 whereby when the screw is rotated the carriage 21 is moved according to the direction of rotation of said screw. The screw 15 is rotated in order to move the carriage 21 so that the work thereon may be elevated or depressed, while the handle 5 is operated to move the work back and forth transversely of the bed 1 and handle 3 is operated for moving the carriage longitudinally of the bed 1.

A milling tool 23 mounted on a shaft 24 and held in a suitable manner in the lathe is provided and operates on the work held in the carriage 21 by a set screw 25. It will be observed that the set screw 25 will clamp any shaped article in the transversely movable carriage 21 so that the milling tool 23 may operate thereon without changing any of the parts. When the milling tool 23 is not desired the same may be quickly removed and bolts 6 and 7 removed so that the wedge 8 and associated parts may be taken off and the ordinary rest or other device again fitted on to the carriage. It is not necessary to in any way change the lathe or any part thereof, and the tool rest which is removed may at any time be again placed in position for operation in the usual manner.

What I claim is:

1. In an attachment for lathes, the combination with the carriage of a lathe provided with a tool rest, of a wedge member clamped to said carriage by the bolts used in clamping the rest in position, said wedge member having a dove-tail projection in the upper face formed with a hollowed-out portion, a transversely movable carriage having a dove-tail groove mating with the dove-tail projection of said wedge, and a threaded sleeve extending into said hollowed-out portion, and a threaded shaft extending through said sleeve and beyond said wedge member for shifting the position of said transversely movable carriage.

2. In an attachment for lathes of the character described, a wedge-shaped block provided with an inclined upper face having a groove therein, said groove being inclosed at the ends by walls having notches, a screw extending through said notches and said groove, means for preventing longitudinal movement of said screw while allowing a rotary movement thereof, a carriage having an inclined lower face and a horizontal upper face, said carriage having the inclined face resting on the inclined face of said wedge, and a threaded sleeve extending from said carriage so as to surround said threaded screw and be moved thereby.

CARL A. KULENKAMPFF.

Copies of this patent may be obtained for five cents each, by addressing the "Commissioner of Patents, Washington, D. C."